United States Patent Office 3,105,006
Patented Sept. 24, 1963

3,105,006
NOVEL N - ARYLSULFONYL - N' - (1,2,3,6 - TETRA-HYDRO-1-PYRIDYL)UREAS AND ORAL ANTI-DIABETIC COMPOSITIONS
John B. Wright, Kalamazoo, Mich., assignor to The Upjohn Company, Kalamazoo, Mich., a corporation of Delaware
No Drawing. Filed July 3, 1961, Ser. No. 121,329
11 Claims. (Cl. 167—55)

The present invention relates to novel N-arylsulfonyl-N'-(1,2,3,6-tetrahydro-1-pyridyl)ureas and more specifically relates to novel N-arylsulfonyl-N'-(1,2,3,6-tetrahydro-1-pyridyl) urea free bases and pharmacologically acceptable acid addition salts thereof, to orally active compositions containing said novel compounds as active ingredients, and to the novel intermediates 1-nitroso-1,2,3,6-tetrahydropyridines and 1-amino-1,2,3,6-tetrahydropyridines useful for the production of the novel N-arylsulfonyl-N'-(1,2,3,6-tetrahydro-1-pyridyl)ureas.

The novel N-arylsulfonyl-N'-(1,2,3,6-tetrahydro-1-pyridyl)urea free bases of the present invention can be represented by the formula:

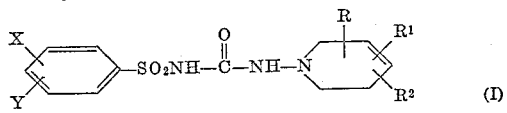

(I)

wherein X and Y represent hydrogen; alkyl of 1 to 8 carbon atoms, inclusive, e.g., methyl, ethyl, propyl, butyl, isopropyl, isobutyl, isoamyl, hexyl, octyl, and the like; alkoxy of 1 to 8 carbon atoms, inclusive, e.g., methoxy, ethoxy, propoxy, butoxy, sec-butoxy, hexyloxy, octyloxy, and the like; alkanoyl of 2 to 5 carbon atoms, inclusive, e.g., acetyl, propionyl, butyryl, isobutyryl, valeryl, and the like; halogen, e.g., chlorine, bromine, and fluorine; and primary amino ($NH_2$). R, $R^1$, and $R^2$ represent hydrogen and alkyl of 1 to 4 carbon atoms, inclusive, e.g., methyl, ethyl, propyl, butyl, isobutyl, and the like.

The novel N-arylsulfonyl-N'-(1,2,3,6-tetrahydro-1-pyridyl)ureas of the present invention are useful oral antidiabetic agents. In the past, diabetes has been alleviated primarily by the use of insulin. Unfortunately, however, insulin cannot be given orally. Thus, the diabetics before the advent of sulfonylurea therapy for the treatment of diabetes were faced with a lifetime of insulin injections necessary for the maintenance of bodily health. The compounds of the present invention thus provide a means for the relief of diabetes without the necessity of injections. The novel compounds are not only capable of reducing blood sugar to a safe level for a considerable period of time but, in addition, also bring about satisfactory blood-sugar reduction at low dosage levels. In addition, the novel compounds are useful in animal feeds and animal feed supplements as set forth in U.S. Patent 2,941,884. The novel compounds are also useful as wetting, emulsifying, and waterproofing agents in the paper and leather industries.

The novel N-arylsulfonyl-N'-(1,2,3,6-tetrahydro-1-pyridyl)ureas of the present invention having Formula I above can be prepared by reacting an arylsulfonylurethane having the formula:

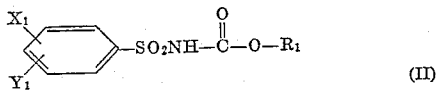

(II)

wherein $R_1$ represents alkyl of 1 to 6 carbon atoms, inclusive, and $X_1$ and $Y_1$ represent hydrogen; alkyl of 1 to 8 carbon atoms, inclusive, e.g., methyl, ethyl, propyl, butyl, isopropyl, isobutyl, isoamyl, hexyl, octyl, and the like; alkoxy of 1 to 8 carbon atoms, inclusive, e.g., methoxy, ethoxy, propoxy, butoxy, sec-butoxy, hexyloxy, octyloxy, and the like; alkanoyl of 2 to 5 carbon atoms, inclusive, e.g., acetyl, propionyl, butyryl, isobutyryl, valeryl, and the like; halogen, e.g., chlorine, bromine, and fluorine; and nitro, with a 1-amino-1,2,3,6-tetrahydropyridine having the formula:

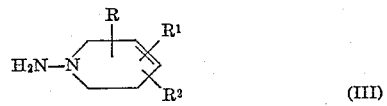

(III)

wherein R, $R^1$, and $R^2$ have the above values, according to the process disclosed by Marshall et al., J. Org. Chem. 23, 927, 1958.

The preparation of compounds of the invention having amino ($NH_2$) substitution on the benzene ring, i.e., N-(aminobenzenesulfonyl)N' - (1,2,3,6 - tetrahydro-1-pyridyl)ureas, involves utilizing a nitro-substituted arylsulfonylurethane, i.e., a nitrobenzenesulfonylurethane, to produce the corresponding intermediate N-(nitrobenzenesulfonyl)-N'-(1,2,3,6-tetrahydro - 1 - pyridyl)urea, which can then be catalytically hydrogenated, e.g., using a platinum oxide or palladium-on-charcoal catalyst, to produce the desired N-(aminobenzenesulfonyl)-N'-(1,2,3,6-tetrahydro-1-pyridyl)urea.

The starting arylsulfonylurethanes, many of which are known, can be prepared as disclosed by Marshall et al., supra.

The starting 1-amino-1,2,3,6-tetrahydropyridines (Formula III above) can be prepared utilizing the process of Zimmer et al., J. Amer. Chem. Soc. 77, 790, 1955. A 1,2,3,6-tetrahydropyridine having the formula:

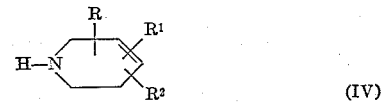

(IV)

wherein R, $R^1$, and $R^2$ have the above values, is nitrosated with nitrous acid (produced in situ, e.g., by means of an alkali-metal nitrite such as sodium nitrite and an acid such as hydrochloric acid), and the resulting 1-nitroso-1,2,3,6-tetrahydropyridine having the formula:

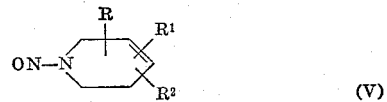

(V)

wherein R, $R^1$, and $R^2$ have the above values, is reduced with lithium aluminum hydride to obtain the corresponding 1-amino-1,2,3,6-tetrahydropyridine.

1,2,3,6-tetrahydropyridines, many of which are known, can be prepared by the general procedures described by Wawzonek et al., J. Amer. Chem. Soc. 74, 2894, 1952, and Ferles, Chem. Listy 52, 668, 1958 (C.A. 52, 13724, 1958). These procedures involve the reduction of pyridine and alkylpyridines electrolytically, and also with sodium and alkanols, preferably 1-butanol.

Pharmacologically acceptable acid addition salts of the present invention can be prepared from the N-arylsulfonyl-N'-(1,2,3,6-tetrahydro-1-pyridyl)urea free bases by conventional methods. For example, the free base can be dissolved in an aqueous solution of the appropriate acid and the salt can be isolated by evaporation of the solution. Alternatively, the free base dissolved in an organic solvent such as methanol, ethanol, ethyl acetate, ether, and the like, can be treated with the appropriate acid and according to the nature of the solvent employed the desired salt will separate spontaneously or can be precipitated by the addition of a solvent in which the salt is insoluble. Suitable acids include hydrochloric, sulfuric, hydrobromic, phosphoric, tartaric, acetic, citric, succinic, maleic, benzoic, salicylic, and the like.

The following examples are illustrative of the process and products of the present invention, but are not to be construed as limiting.

EXAMPLE 1. — N-(4 - METHYLBENZENESULFONYL)-N'-(1,2,3,6-TETRAHYDRO-1-PYRIDYL)UREA

A. 1-Nitroso-1,2,3,6-Tetrahydropyridine

A solution of 83 ml. (1.0 mole) of concentrated hydrochloric acid, 40 ml. of water, and 83.13 g. (1.0 mole) of 1,2,3,6-tetrahydropyridine was warmed to 70° C. To the solution was added dropwise a solution of 74.5 g. (1.08 moles) of sodium nitrite in 110 ml. of water over a 1-hour period, while maintaining the reaction mixture between 70° and 80° C. The mixture was maintained at the same temperature for an additional 4 hours and was then cooled in an ice bath. The yellow oil layer was separated and the aqueous layer was extracted with ether. The ether extracts were combined with the oil layer. The solution was dried over anhydrous magnesium sulfate and concentrated to dryness. Upon distillation of the residue at reduced pressure there was obtained 103.7 g. (92.4% yield) of 1-nitroso-1,2,3,6-tetrahydropyridine as a yellow oil boiling at 101° C./17 mm.

*Analysis.*—Calcd. for $C_5H_8N_2O$: C, 53.56; H, 7.19. Found: C, 53.37; H, 7.49.

B. 1-Amino-1,2,3,6-Tetrahydropyridine

A stirred mixture of 42.0 g. (1.11 moles) of lithium aluminum hydride in anhydrous ether was refluxed for 20 minutes. A solution of 103.7 g. (0.924 mole) of 1-nitroso-1,2,3,6-tetrahydropyridine in 400 ml. of anhydrous ether was added dropwise over a period of 4 hours, while maintaining the reaction mixture at a gentle reflux. Refluxing was continued for 4 hours before decomposing the reaction mixture by the successive addition of 44 ml. of water, 33 ml. of 20% aqueous sodium hydroxide solution, and 155 ml. of water. The mixture was filtered and the filtrate was retained, to be combined with a second filtrate obtained by suspending the filter cake in ether and filtering the suspension. The combined filtrates were dried over anhydrous magnesium sulfate. The ether was removed on the steam bath and the residue was distilled at reduced pressure to yield 1-amino-1,2,3,6-tetrahydropyridine as a colorless oil boiling at 57–67° C./17 mm.; $n_D^{26}=1.4974$. This compound upon redistillation boiled at 98° C./28 mm.

For further characterization purposes the hydrochloride was prepared, by addition of gaseous hydrogen chloride to an ethereal solution of the free base. Recrystallization from anhydrous ethanol gave 1-amino-1,2,3,6-tetrahydropyridine hydrochloride melting at 154–5° C.

*Analysis.*—Calcd. for $C_5H_{10}N_2 \cdot HCl$: C, 44.61; H, 8.24; Cl, 26.34; N, 20.82. Found: C, 44.82; H, 8.50; Cl, 26.57; N, 20.92.

C. N-(4-Methylbenzenesulfonyl)-N'-(1,2,3,6-Tetrahydro-1-Pyridyl)Urea Free Base A stirred mixture of 9.82 g. (0.1 mole) of 1-amino-1,2,3,6-tetrahydropyridine and 22.92 g. (0.1 mole) of 4-methylbenzenesulfomethylurethane (methyl 4-methylbenzenesulfonylcarbamate) was heated at 130° C. (oil bath temperature) for 2 hours. The resulting methanol and unreacted amine were removed at 15 mm. pressure for 2 hours at the same bath temperature. The residue was recrystallized from 95% ethanol to give 18.77 g. of tan tinted prisms melting at 174–181° C. A second recrystallization from 95% ethanol gave 13.19 g. (45% yield) of N-(4-methylbenzenesulfonyl)-N'-(1,2,3,6-tetrahydro-1-pyridyl)urea free base in the form of yellow tinted prisms melting at 179–181° C.

*Analysis.*—Calcd. for $C_{13}H_{17}N_3O_3S$: C, 52.86; H, 5.80; N, 14.23; S, 10.85. Found: C, 52.76; H, 5.54; N, 14.16; S, 10.82.

D. N-(4-Methylbenzenesulfonyl)-N'-(1,2,3,6-Tetrahydro-1-Pyridyl)Urea Hydrochloride N-(4 - methylbenzenesulfonyl)-N'-(1,2,3,6-tetrahydro-1-pyridyl)urea free base was dissolved in ether and gaseous hydrogen chloride was added thereto to produce N-(4 - methylbenzenesulfonyl)-N'-(1,2,3,6-tetrahydro-1-pyridyl)urea hydrochloride.

EXAMPLE 2. — N-(4 - METHYLBENZENESULFONYL)-N'-(1,2,3,6-TETRAHYDRO - 4 - METHYL-1-PYRIDYL)UREA

A. 4-Methyl-1,2,3,6-Tetrahydropyridine 4-methyl-1,2,3,6-tetrahydropyridine was prepared by the reduction of 4-picoline with sodium and 1-butanol according to the general procedure of Wawzonek et al., supra.

B. 1-Nitroso-4-Methyl-1,2,3,6-Tetrahydropyridine

To a stirred solution of 13.3 ml. of concentrated hydrochloric acid and 6.6 ml. of water was added slowly 15.6 g. (0.16 mole) of 4-methyl-1,2,3,6-tetrahydropyridine. To this solution, maintained between 70° and 80° C., was added dropwise a solution of 11.8 g. (0.17 mole) of sodium nitrite in 19 ml. of water. The reaction mixture was maintained at the same temperature for 2 hours and then extracted twice with ether followed by two extractions with chloroform. The extracts were combined, dried over anhydrous magnesium sulfate, and concentrated to dryness. The residue was distilled at reduced pressure, to yield 15.7 g. (79% yield) of 1-nitroso-4-methyl-1,2,3,6-tetrahydropyridine as a yellow oil boiling at 109° C./12 mm.; $n_D^{26}=1.5065$.

In the same manner as disclosed in Example 2, Part B, 1-nitroso-4-ethyl-1,2,3,6-tetrahydropyridine,
1-nitroso-4-propyl-1,2,3,6-tetrahydropyridine,
1-nitroso-4-butyl-1,2,3,6-tetrahydropyridine,
1-nitroso-4-isopropyl-1,2,3,6-tetrahydropyridine,
1-nitroso-3-methyl-1,2,3,6-tetrahydropyridine,
1-nitroso-3-propyl-1,2,3,6-tetrahydropyridine,
1-nitroso-3-tert-butyl-1,2,3,6-tetrahydropyridine,
1-nitroso-3-ethyl-1,2,3,6-tetrahydropyridine,
1-nitroso-2-methyl-1,2,3,6-tetrahydropyridine,
1-nitroso-2-ethyl-1,2,3,6-tetrahydropyridine,
1-nitroso-2-butyl-1,2,3,6-tetrahydropyridine,
1-nitroso-2-isopropyl-1,2,3,6-tetrahydropyridine,
1-nitroso-2-methyl-4-ethyl-1,2,3,6-tetrahydropyridine,
1-nitroso-3-methyl-4-ethyl-1,2,3,6-tetrahydropyridine,
1-nitroso-2,6-dimethyl-4-ethyl-1,2,3,6-tetrahydropyridine, and the like are prepared by substituting 4-ethyl-1,2,3,6-tetrahydropyridine,
4-propyl-1,2,3,6-tetrahydropyridine,
4-butyl-1,2,3,6-tetrahydropyridine,
4-isopropyl-1,2,3,6-tetrahydropyridine,
3-methyl-1,2,3,6-tetrahydropyridine,
3-propyl-1,2,3,6-tetrahydropyridine,
3-tert-butyl-1,2,3,6-tetrahydropyridine,
3-ethyl-1,2,3,6-tetrahydropyridine,
2-methyl-1,2,3,6-tetrahydropyridine,
2-ethyl-1,2,3,6-tetrahydropyridine,
2-butyl-1,2,3,6-tetrahydropyridine,
2-isopropyl-1,2,3,6-tetrahydropyridine,
2-methyl-4-ethyl-1,2,3,6-tetrahydropyridine,
3-methyl-4-ethyl-1,2,3,6-tetrahydropyridine,
2,6-dimethyl-4-ethyl-1,2,3,6-tetrahydropyridine, and the like, for 4-methyl-1,2,3,6-tetrahydropyridine.

C. 1-Amino-4-Methyl-1,2,3,6-Tetrahydropyridine

In the same manner as disclosed in Example 1, Part B, 1-amino-4-methyl-1,2,3,6-tetrahydropyridine was prepared by reducing 1-nitroso-4-methyl-1,2,3,6-tetrahydropyridine with lithium aluminum hydride instead of 1-nitroso-1,2,3, 6-tetrahydropyridine. The compound was obtained as a colorless liquid boiling at 160–170° C.; $n_D^{25}=1.4916$; 55% yield.

In the same manner as disclosed in Example 2, Part C, 1-amino-4-ethyl-1,2,3,6-tetrahydropyridine,
1-amino-4-propyl-1,2,3,6-tetrahydropyridine,
1-amino-4-butyl-1,2,3,6-tetrahydropyridine,
1-amino-4-isopropyl-1,2,3,6-tetrahydropyridine,
1-amino-3-methyl-1,2,3,6-tetrahydropyridine,
1-amino-3-propyl-1,2,3,6-tetrahydropyridine,
1-amino-3-tert-butyl-1,2,3,6-tetrahydropyridine,
1-amino-3-ethyl-1,2,3,6-tetrahydropyridine,
1-amino-2-methyl-1,2,3,6-tetrahydropyridine,
1-amino-2-ethyl-1,2,3,6-tetrahydropyridine,
1-amino-2-butyl-1,2,3,6-tetrahydropyridine,
1-amino-2-isopropyl-1,2,3,6-tetrahydropyridine,
1-amino-2-methyl-4-ethyl-1,2,3,6-tetrahydropyridine,
1-amino-3-methyl-4-ethyl-1,2,3,6-tetrahydropyridine,
1-amino-2,6-dimethyl-4-ethyl-1,2,3,6-tetrahydropyridine, and the like, are prepared by substituting 1-nitroso-4-ethyl-1,2,3,6-tetrahydropyridine,
1-nitroso-4-propyl-1,2,3,6-tetrahydropyridine,
1-nitroso-4-butyl-1,2,3,6-tetrahydropyridine,
1-nitroso-4-isopropyl-1,2,3,6-tetrahydropyridine,
1-nitroso-3-methyl-1,2,3,6-tetrahydropyridine,
1-nitroso-3-propyl-1,2,3,6-tetrahydropyridine,
1-nitroso-3-tert-butyl-1,2,3,6-tetrahydropyridine,
1-nitroso-3-ethyl-1,2,3,6-tetrahydropyridine,
1-nitroso-2-methyl-1,2,3,6-tetrahydropyridine,
1-nitroso-2-ethyl-1,2,3,6-tetrahydropyridine,
1-nitroso-2-butyl-1,2,3,6-tetrahydropyridine,
1-nitroso-2-isopropyl-1,2,3,6-tetrahydropyridine,
1-nitroso-2-methyl-4-ethyl-1,2,3,6-tetrahydropyridine,
1-nitroso-3-methyl-4-ethyl-1,2,3,6-tetrahydropyridine,
1-nitroso-2,6-dimethyl-4-ethyl-1,2,3,6-tetrahydropyridine, and the like, for 1-nitroso-4-methyl-1,2,3,6-tetrahydropyridine.

D. *N-(4-Methylbenzenesulfonyl)-N'-(1,2,3,6-Tetrahydro-4-Methyl-1-Pyridyl)Urea Free Base*

A mixture of 7.6 g. (0.068 mole) of 1-amino-4-methyl-1,2,3,6-tetrahydropyridine and 15.5 g. (0.068 mole) of 4-methylbenzenesulfomethylurethane was heated at 125–130° C. (oil bath temperature) for 2 hours. Heating was continued at the same temperature for an additional 2 hours at a pressure of 15 mm. The residue was recrystallized from 95% ethanol to obtain 13.55 g. (64.5% yield) of N-(4-methylbenzenesulfonyl)-N'-(1,2,3,6-tetrahydro-4-methyl-1-pyridyl)urea free base as colorless prisms melting at 183.5–184° C.

*Analysis.*—Calcd. for $C_{14}H_{19}N_3O_3S$: C, 54.35; H, 6.19; N, 13.58; S, 10.36. Found: C, 54.51; H, 5.93; N, 13.26; S, 10.61.

E. *N-(4-Methylbenzenesulfonyl)-N'-(1,2,3,6-Tetrahydro-4-Methyl-1-Pyridyl)Urea Citrate*

In the same manner as shown in Example 1, Part D, N-(4-methylbenzenesulfonyl)-N'-(1,2,3,6-tetrahydro-4-methyl-1-pyridyl)urea citrate was prepared by using N-(4-methylbenzenesulfonyl)-N'-(1,2,3,6-tetrahydro-4-methyl-1-pyridyl)urea free base and citric acid instead of N-(4-methylbenzenesulfonyl)-N'-(1,2,3,6-tetrahydro-1-pyridyl)urea free base and hydrogen chloride.

EXAMPLE 3.—N-(4-CHLOROBENZENESULFONYL)-N'-(1,2,3,6-TETRAHYDRO-1-PYRIDYL)UREA

A. *N-(4-Chlorobenzenesulfonyl)-N'-(1,2,3,6-Tetrahydro-1-Pyridyl)Urea Free Base*

A mixture of 26.37 g. (0.1 mole) of 4-chlorobenzenesulfonylurethane (ethyl 4-chlorobenzenesulfonylcarbamate) and 9.82 g. (0.1 mole) of 1-amino-1,2,3,6-tetrahydropyridine was heated at 120° C. (oil bath temperature) for 2 hours, and was then heated at the same temperature for 1 hour at a pressure of 15 mm. The residue was recrystallized from dioxane. There was thus obtained 13.23 g. of N-(4-chlorobenzenesulfonyl)-N'-(1,2,3,6-tetrahydro-1-pyridyl)urea free base as colorless prisms melting at 203° (dec.).

*Analysis.*—Calcd. for $C_{12}H_{14}ClN_3O_3S$: C, 45.64; H, 4.47; Cl, 11.23; N, 13.31; S, 10.15. Found: C, 45.82; H, 4.45; Cl, 11.26; N, 13.41; S, 10.18.

B. *N-(4-Chlorobenzenesulfonyl)-N'-(1,2,3,6-Tetrahydro-1-Pyridyl)Urea Sulfate*

In the same manner as shown in Example 1, Part D, N-(4-chlorobenzenesulfonyl)-N'-(1,2,3,6-tetrahydro-1-pyridyl)urea sulfate was prepared by using N-(4-chlorobenzenesulfonyl)-N'-(1,2,3,6-tetrahydro-1-pyridyl)urea free base and sulfuric acid instead of N-(4-methylbenzenesulfonyl)-N'-(1,2,3,6-tetrahydro-1-pyridyl)urea free base and hydrogen chloride.

EXAMPLE 4.—N-(4-CHLOROBENZENESULFONYL)-N'-(1,2,3,6-TETRAHYDRO-4-ETHYL-1-PYRIDYL)UREA FREE BASE

In the same manner as shown in Example 2, Part D, N-(4-chlorobenzenesulfonyl)-N'-(1,2,3,6-tetrahydro-4-ethyl-1-pyridyl)urea free base was prepared by using 4-chlorobenzene-sulfonylurethane and 1-amino-4-ethyl-1,2,3,6-tetrahydropyridine instead of 4-methylbenzenesulfomethylurethane and 1-amino-4-methyl-1,2,3,6-tetrahydropyridine.

EXAMPLE 5.—N-(4-METHOXYBENZENESULFONYL)-N'-(1,2,3,6-TETRAHYDRO-4-PROPYL-1-PYRIDYL)UREA

A. *N-(4-Methoxybenzenesulfonyl)-N'-(1,2,3,6-Tetrahydro-4-Propyl-1-Pyridyl)Urea Free Base*

In the same manner as shown in Example 2, Part D, N-(4-methoxybenzenesulfonyl)-N'-(1,2,3,6-tetrahydro-4-propyl-1-pyridyl)urea free base was prepared by using 4-methoxybenzenesulfonylurethane and 1-amino-4-propyl-1,2,3,6-tetrahydropyridine instead of 4-methylbenzenesulfomethylurethane and 1-amino-4-methyl-1,2,3,6-tetrahydropyridine.

B. *N-(4-Methoxybenzenesulfonyl)-N'-(1,2,3,6-Tetrahydro-4-Propyl-1-Pyridyl)Urea Tartrate*

In the same manner as shown in Example 1, Part D, N-(4-methoxybenzenesulfonyl)-N'-(1,2,3,6-tetrahydro-4-propyl-1-pyridyl)urea tartrate was prepared by using N-(4-methoxybenzenesulfonyl)-N'-(1,2,3,6-tetrahydro-4-propyl-1-pyridyl)urea free base and tartaric acid instead of N-(4-methylbenzenesulfonyl)-N'-(1,2,3,6-tetrahydro-1-pyridyl)urea free base and hydrogen chloride.

EXAMPLE 6.—N-(3-ETHYLBENZENESULFONYL)-N'-(1,2,3,6-TETRAHYDRO-4-BUTYL-1-PYRIDYL)UREA

A. *N-(3-Ethylbenzenesulfonyl)-N'-(1,2,3,6-Tetrahydro-4-Butyl-1-Pyridyl)Urea Free Base*

In the same manner as shown in Example 2, Part D, N-(3-ethylbenzenesulfonyl)-N'-(1,2,3,6-tetrahydro-4-butyl-1-pyridyl)urea free base was prepared by using 3-ethylbenzenesulfonylurethane and 1-amino-4-butyl-1,2,3,6-tetrahydropyridine instead of 4-methylbenzenesulfomethylurethane and 1-amino-4-methyl-1,2,3,6-tetrahydropyridine.

B. *N-(3-Ethylbenzenesulfonyl)-N'-(1,2,3,6-Tetrahydro-4-Butyl-1-Pyridyl)Urea Phosphate*

In the same manner as shown in Example 1, Part D, N-(3-ethylbenzenesulfonyl)-N'-(1,2,3,6-tetrahydro-4-butyl-1-pyridyl)urea phosphate was prepared by using N-(3-ethylbenzenesulfonyl)-N'-(1,2,3,6-tetrahydro-4-butyl-1-pyridyl)urea free base and phosphoric acid instead of N-(4-methylbenzenesulfonyl)-N'-(1,2,3,6-tetrahydro-1-pyridyl)urea free base and hydrogen chloride.

EXAMPLE 7.—N-(2-PROPYLBENZENESULFONYL)-N'-(1,2,3,6-TETRAHYDRO-3-METHYL-1-PYRIDYL)UREA

A. *N - (2 - Propylbenzenesulfonyl)-N'-(1,2,3,6-Tetrahydro-3-Methyl-1-Pyridyl)Urea Free Base*

In the same manner as shown in Example 2, Part D, N - (2 - propylbenzenesulfonyl) - N' - (1,2,3,6 - tetrahydro-3-methyl-1-pyridyl)urea free base was prepared by using 2-propylbenzenesulfonylurethane and 1-amino-3-methyl-1,2,3,6-tetrahydropyridine instead of 4-methylbenzenesulfomethylurethane and 1-amino-4-methyl-1,2,3,6-tetrahydropyridine.

B. *N - (2 - Propylbenzenesulfonyl) - N' - (1,2,3,6-Tetrahydro-3-Methyl-1-Pyridyl)Urea Succinate*

In the same manner as shown in Example 1, Part D, N - 2 - propylbenzenesulfonyl) - N' - (1,2,3,6-tetrahydro-3-methyl-1-pyridyl)urea succinate was prepared by using N-(2 - propylbenzenesulfonyl) - N' - (1,2,3,6 - tetrahydro-3-methyl-1-pyridyl)urea free base and succinic acid instead of N-(4-methylbenzenesulfonyl)-N'-(1,2,3,6-tetrahydro-1-pyridyl)urea free base and hydrogen chloride.

EXAMPLE 8.—N-(4-BUTYLBENZENESULFONYL)-N'-(1,2,3,6-TETRAHYDRO-3-PROPYL-1-PYRIDYL)UREA

A. *N - (4 - Butylbenzenesulfonyl) - N'-(1,2,3,6-Tetrahydro-3-Propyl-1-Pyridyl)Urea Free Base*

In the same manner as shown in Example 2, Part D, N - (4 - butylbenzenesulfonyl) - N'-(1,2,3,6-tetrahydro-3-propyl-1-pyridyl)urea free base was prepared by using 4-butylbenzenesulfonylurethane and 1-amino-3-propyl-1,2,3,6-tetrahydropyridine instead of 4-methylbenzenesulfomethylurethane and 1-amino-4-methyl-1,2,3,6-tetrahydropyridine.

B. *N - (4 - Butylbenzenesulfonyl) - N' - (1,2,3,6-Tetrahydro-3-Propyl-1-Pyridyl)Urea Maleate*

In the same manner as shown in Example 1, Part D, N - (4 - butylbenzenesulfonyl) - N'-(1,2,3,6-tetrahydro-3-propyl-1-pyridyl)urea maleate was prepared by using N-(4 - butylbenzenesulfonyl) - N' - (1,2,3,6 - tetrahydro-3-propyl-1-pyridyl)urea free base and maleic acid instead of N - (4 - methylbenzenesulfonyl) - N'-(1,2,3,6-tetrahydro-1-pyridyl)urea free base and hydrogen chloride.

EXAMPLE 9.—N-(3-BROMOBENZENESULFONYL)-N' - (1,2,3,6 - TETRAHYDRO - 3 - TERT - BUTYL-1-PYRIDYL)UREA

A. *N - (3 - Bromobenzenesulfonyl) - N'-(1,2,3,6-Tetrahydro-3-Tert-Butyl-1-Pyridyl)Urea Free Base*

In the same manner as shown in Example 2, Part D, N - (3 - bromobenzenesulfonyl) - N' - (1,2,3,6 - tetrahydro-3-tert-butyl-1-pyridyl)urea free base was prepared by using 3-bromobenzenesulfonylurethane and 1-amino-3-tert-butyl-1,2,3,6-tetrahydropyridine instead of 4-methylbenzenesulfomethylurethane and 1-amino-4-methyl-1,2,3,6-tetrahydropyridine.

B. *N - (3 - Bromobenzenesulfonyl) - N' - (1,2,3,6-Tetrahydro-3-Tert-Butyl-1-Pyridyl)Urea Benzoate*

In the same manner as shown in Example 1, Part D, N - (3 - bromobenzensulfonyl) - N' - (1,2,3,6 - tetrahydro-3-tert-butyl-1-pyridyl)urea benzoate was prepared by using N - (3 - bromobenzenesulfonyl) - N' - (1,2,3,6-tetrahydro-3-tert-butyl-1-pyridyl)urea free base and benzoic acid instead of N-(4-methylbenzenesulfonyl)-N'-(1,2,3,6-tetrahydro-1-pyridyl)urea free base and hydrogen chloride.

EXAMPLE 10. — N - (3 - ETHOXYBENZENESULFONYL) - N' - (1,2,3,6 - TETRAHYDRO-2-ETHYL-1-PYRIDYL)UREA

A. *N-(3-Ethoxybenzenesulfonyl)-N'-(1,2,3,6-Tetrahydro-2-Ethyl-1-Pyridyl)Urea Free Base*

In the same manner as shown in Example 2, Part D, N - (3 - ethoxybenzenesulfonyl) - N' - (1,2,3,6-tetrahydro-2-ethyl-1-pyridyl)urea free base was prepared by using 3-ethoxybenzensulfonylurethane and 1-amino-2-ethyl-1,2,3,6-tetrahydropyridine instead of 4-methylbenzenesulfomethylurethane and 1-amino-4-methyl-1,2,3,6-tetrahydropyridine.

B. *N - (3 - Ethoxybenzenesulfonyl) - N' - (1,2,3,6-Tetrahydro-2-Ethyl-1-Pyridyl)Urea Hydrobromide*

In the same manner as shown in Example 1, Part D, N - (3 - ethoxybenzenesulfonyl) - N' - (1,2,3,6 - tetrahydro-2-ethyl-1-pyridyl)urea hydrobromide was prepared by using N - (3 - ethoxybenzenesulfonyl) - N' - (1,2,3,6 - tetrahydro-2-ethyl-1-pyridyl)urea free base and hydrogen bromide instead of N-(4-methylbenzenesulfonyl)-N'-(1,2,3,6-tetrahydro-1-pyridyl)urea free base and hydrogen chloride.

EXAMPLE 11.—N - (4 - PROPYLBENZENESULFONYL) - N' - (1,2,3,6 - TETRAHYDRO - 2 - BUTYL - 1-PYRIDYL)UREA

A. *N - (4 - Propylbenzenesulfonyl) - N'-(1,2,3,6-Tetrahydro-2-Butyl-1-Pyridyl)Urea Free Base*

In the same manner as shown in Example 2, Part D, N - (4 - propylbenzenesulfonyl) - N' - (1,2,3,6-tetrahydro-2-butyl-1-pyridyl)urea free base was prepared by using 4-propylbenzenesulfonylurethane and 1-amino-2-butyl-1,2,3,6-tetrahydropyridine instead of 4-methylbenzenesulfomethylurethane and 1-amino-4-methyl-1,2,3,6-tetrahydropyridine.

B. *N - (4 - Propylbenzenesulfonyl) - N' - (1,2,3,6-Tetrahydro-2-Butyl-1-Pyridyl)Urea Acetate*

In the same manner as shown in Example 1, Part D, N - (4 - propylbenzenesulfonyl) - N' - (1,2,3,6 - tetrahydro-2-butyl-1-pyridyl)urea acetate was prepared by using N - (4 - propylbenzenesulfonyl) - N' - (1,2,3,6-tetrahydro-2-butyl-1-pyridyl)urea free base and acetic acid instead of N - (4 - methylbenzenesulfonyl) - N'-(1,2,3,6-tetrahydro-1-pyridyl)urea free base and hydrogen chloride.

EXAMPLE 12.—N - (4 - PROPOXYBENZENESULFONYL) - N' - (1,2,3,6 - TETRAHYDRO - 2 - ISOPROPYL-1-PYRIDYL)UREA

A. *N-(4-Propoxybenzenesulfonyl)-N'-(1,2,3,6-Tetrahydro-2-Isopropyl-1-Pyridyl)Urea Free Base*

In the same manner as shown in Example 2, Part D, N-(4-propoxybenzenesulfonyl)-N'-(1,2,3,6-tetrahydro - 2-isopropyl-1-pyridyl)urea free base was prepared by using 4-propoxybenzenesulfonylurethane and 1-amino-2-isopropyl-1,2,3,6-tetrahydorpyridine instead of 4-methylbenzenesulfomethylurethane and 1-amino-4-methyl-1,2,3,6-tetrahydropyridine.

B. *N - (4 - Propoxybenzenesulfonyl) - N' - (1,2,3,6-Tetrahydro-2-Isopropyl-1-Pyridyl)Urea Salicylate*

In the same manner as shown in Example 1, Part D, N - (4 - propoxybenzenesulfonyl) - N' - (1,2,3,6-tetrahydro-2-isopropyl-1-pyridyl)urea salicylate was prepared by using N-(4-propoxybenzenesulfonyl)-N'-(1,2,3,6-tetrahydro-2-isopropyl-1-pyridyl)urea free base and salicylic acid instead of N-(4-methylbenzenesulfonyl)-N'-(1,2,3,6-tetrahydro-1-pyridyl)urea free base and hydrogen chloride.

EXAMPLE 13.—N-(3-BUTOXYBENZENESULFONYL)-N'-(1,2,3,6-TETRAHYDRO-1-PYRIDYL)UREA FREE BASE

In the same manner as shown in Example 1, Part C, N-(3-butoxybenzenesulfonyl)-N'-(1,2,3,6-tetrahydro-1-pyridyl)urea free base was prepared by using 3-butoxybenzenesulfonylurethane instead of 4-methylbenzenesulfomethylurethane.

EXAMPLE 14.—N-(3-CHLORO-4-METHYL-BENZENESULFONYL)-N'-(1,2,3,6-TETRAHYDRO-1-PPRIDYL)UREA FREE BASE

In the same manner as shown in Example 1, Part C, N-(3-chloro-4-methylbenzenesulfonyl)-N'-(1,2,3,6-tetrahydro-1-pyridyl)urea free base was prepared by using 3-chloro-4-methylbenzenesulfonylurethane instead of 4-methylbenzenesulfomethylurethane.

EXAMPLE 15.—N-(4-FLUOROBENZENESULFONYL)-N'-(1,2,3,6-TETRAHYDRO-1-PYRIDYL)UREA FREE BASE

In the same manner as shown in Example 1, Part C, N-(4-fluorobenzenesulfonyl)-N'-(1,2,3,6-tetrahydro-1-pyridyl)urea free base was prepared by using 4-fluorobenzenesulfonylurethane instead of 4-methylbenzenesulfomethylurethane.

EXAMPLE 16.—N-(2,4-DICHLOROBENZENESULFONYL)-N'-(1,2,3,6-TETRAHYDRO-4-ISOPROPYL-1-PYRIDYL)UREA FREE BASE

In the same manner as shown in Example 2, Part D, N-(2,4-dichlorobenzenesulfonyl)-N'-(1,2,3,6-tetrahydro-4-isopropyl-1-pyridyl)urea free base was prepared by using 2,4-dichlorobenzenesulfonylurethane and 1-amino-4-isopropyl-1,2,3,6-tetrahydropyridine instead of 4-methylbenzenesulfomethylurethane and 1-amino-4-methyl-1,2,3,6-tetrahydropyridine.

EXAMPLE 17.—N-(2-METHYL-4-METHOXYBENZENESULFONYL)-N'-(1,2,3,6-TETRAHYDRO-3-ETHYL-1-PYRIDYL)UREA FREE BASE

In the same manner as shown in Example 2, Part D, N-(2-methyl-4-methoxybenzenesulfonyl)-N'-(1,2,3,6-tetrahydro-3-ethyl-1-pyridyl)urea free base was prepared by using 2-methyl-4-methoxybenzenesulfonylurethane and 1-amino-3-ethyl-1,2,3,6-tetrahydropyridine instead of 4-methylbenzenesulfomethylurethane and 1-amino-4-methyl-1,2,3,6-tetrahydropyridine.

EXAMPLE 18.—N-(2,6-DIMETHYLBENZENESULFONYL)-N'-(1,2,3,6-TETRAHYDRO-2-METHYL-1-PYRIDYL)UREA FREE BASE

In the same manner as shown in Example 2, Part D, N-(2,6-dimethylbenzenesulfonyl)-N'-(1,2,3,6-tetrahydro-2-methyl-1-pyridyl)urea free base was prepared by using 2,6-dimethylbenzenesulfonylurethane and 1-amino-2-methyl-1,2,3,6-tetrahydropyridine instead of 4-methylbenzenesulfomethylurethane and 1-amino-4-methyl-1,2,3,6-tetrahydropyridine.

EXAMPLE 19.—N-(4-AMINOBENZENESULFONYL)-N'-(1,2,3,6-TETRAHYDRO-4-METHYL-1-PYRIDYL)UREA FREE BASE

A. *N-(4-Nitrobenzenesulfonyl)-N'-(1,2,3,6-Tetrahydro-4-Methyl-1-Pyridyl)Urea Free Base*

In the same manner as shown in Example 2, Part D, N-(4-nitrobenzenesulfonyl)-N'-(1,2,3,6-tetrahydro-4-methyl-1-pyridyl)urea free base was prepared by using 4-nitrobenzenesulfonylurethane instead of 4-methylbenzenesulfomethylurethane.

B. *N-(4-Aminobenzenesulfonyl)-N'-(1,2,3,6-Tetrahydro-4-Methyl-1-Pyridyl)Urea Free Base*

Hydrogenation of N-(4-nitrobenzenesulfonyl)-N'-(1,2,3,6-tetrahydro-4-methyl-1-pyridyl)urea free base in a 1:30 ammonium hydroxide solution with 10% palladium-on-charcoal catalyst resulted in a solid which was recrystallized from 95% ethanol to produce N-(4-aminobenzenesulfonyl)-N'-(1,2,3,6-tetrahydro-4-methyl-1-pyridyl)urea free base.

EXAMPLE 20.—N-(4-METHYL-3-AMINOBENZENESULFONYL)-N'-(1,2,3,6-TETRAHYDRO-1-PYRIDYL)UREA FREE BASE

A. *N-(4-Methyl-3-Nitrobenzenesulfonyl)-N'-(1,2,3,6-Tetrahydro-1-Pyridyl)Urea Free Base*

In the same manner as shown in Example 1, Part C, N-(4-methyl-3-nitrobenzenesulfonyl)-N'-(1,2,3,6-tetrahydro-1-pyridyl)urea free base was prepared by using 4-methyl-3-nitrobenzenesulfonylurethane instead of 4-methylbenzenesulfomethylurethane.

B. *N-(4-Methyl-3-Aminobenzenesulfonyl)-N'-(1,2,3,6-Tetrahydro-1-Pyridyl)Urea Free Base*

Hydrogenation of N-(4-methyl-3-nitrobenzenesulfonyl)-N'-(1,2,3,6-tetrahydro-1-pyridyl)urea free base in the same manner as shown in Example 19, Part B, resulted in the production of N-(4-methyl-3-aminobenzenesulfonyl)-N'-(1,2,3,6-tetrahydro-1-pyridyl)urea free base.

EXAMPLE 21.—N-(4-ACETYLBENZENESULFONYL)-N'-(1,2,3,6-TETRAHYDRO-1-PYRIDYL)UREA FREE BASE

In the same manner as shown in Example 1, Part C, N-(4-acetylbenzenesulfonyl)-N'-(1,2,3,6-tetrahydro-1-pyridyl)urea free base was prepared by using 4-acetylbenzenesulfonylurethane instead of 4-methylbenzenesulfomethylurethane.

EXAMPLE 22.—N-(3-PROPIONYLBENZENESULFONYL)-N'-(1,2,3,6-TETRAHYDRO-2-ETHYL-1-PYRIDYL)UREA FREE BASE

In the same manner as shown in Example 2, Part D, N-(3-propionylbenzenesulfonyl)-N'-(1,2,3,6-tetrahydro-2-ethyl-1-pyridyl)urea free base was prepared by using 3-propionylbenzene-sulfonylurethane and 1-amino-2-ethyl-1,2,3,6-tetrahydropyridine instead of 4-methylbenzenesulfomethylurethane and 1-amino-4-methyl-1,2,3,6-tetrahydropyridine.

EXAMPLE 23.—N-BENZENESULFONYL-N'-(1,2,3,6-TETRAHYDRO-4-METHYL-1-PYRIDYL)UREA FREE BASE

In the same manner as shown in Example 2, Part D, N-benzenesulfonyl-N'-(1,2,3,6-tetrahydro-4-methyl-1-pyridyl)urea free base was prepared by using benzenesulfonylurethane instead of 4-methylbenzenesulfomethylurethane.

EXAMPLE 24.—N-(4-OCTYLBENZENESULFONYL)-N'-(1,2,3,6-TETRAHYDRO-2-METHYL-4-ETHYL-1-PYRIDYL)UREA FREE BASE

In the same manner as shown in Example 2, Part D, N-(4-octylbenzenesulfonyl)-N'-(1,2,3,6-tetrahydro-2-methyl-4-ethyl-1-pyridyl)urea free base was prepared by using 4-octylbenzenesulfonylurethane and 1-amino-2-methyl-4-ethyl-1,2,3,6-tetrahydropyridine instead of 4-methylbenzenesulfomethylurethane and 1-amino-4-methyl-1,2,3,6-tetrahydropyridine.

EXAMPLE 25.—N-(4-OCTYLOXYBENZENESULFONYL)-N'-(1,2,3,6-TETRAHYDRO-3-METHYL-4-ETHYL-1-PYRIDYL)UREA FREE BASE

In the same manner as shown in Example 2, Part D, N-(4-octyloxybenzenesulfonyl)-N'-(1,2,3,6-tetrahydro-3-methyl-4-ethyl-1-pyridyl)urea free base was prepared by using 4-octyloxybenzenesulfonylurethane and 1-amino-3-methyl-4-ethyl-1,2,3,6-tetrahydropyridine instead of 4-methylbenzenesulfomethylurethane and 1-amino-4-methyl-1,2,3,6-tetrahydropyridine.

EXAMPLE 26.—N-(2,4-DIMETHOXYBENZENESULFONYL) - N'-(1,2,3,6-TETRAHYDRO-2-METHYL-4-ETHYL-1-PYRIDYL)UREA FREE BASE

In the same manner as shown in Example 2, Part D, N - (2,4 - dimethoxybenzenesulfonyl) - N' - (1,2,3,6-tetrahydro-2-methyl-4-ethyl-1-pyridyl)urea free base was prepared by using 2,4-dimethoxybenzenesulfonylurethane and 1 - amino-2-methyl-4-ethyl-1,2,3,6-tetrahydropyridine instead of 4-methylbenzenesulfomethylurethane and 1-amino-4-methyl-1,2,3,6-tetrahydropyridine.

EXAMPLE 27.—N-(4-HEXYLBENZENESULFONYL)-N' - (1,2,3,6 - TETRAHYDRO-4-METHYL-1-PYRIDYL)UREA FREE BASE

In the same manner as shown in Example 2, Part D, N - (4 - hexylbenzenesulfonyl) - N' - (1,2,3,6 - tetrahydro-4-methyl-1-pyridyl)urea free base was prepared by using 4-hexylbenzenesulfonylurethane instead of 4-methylbenzenesulfomethylurethane.

EXAMPLE 28.—N-(3-AMYLOXYBENZENESULFONYL) - N' - (1,2,3,6 - TETRAHYDRO-4-ETHYL-1-PYRIDYL)UREA FREE BASE

In the same manner as shown in Example 2, Part D, N - (3 - amyloxybenzenesulfonyl) - N' - (1,2,3,6 - tetrahydro-4-ethyl-1-pyridyl)urea free base was prepared by using 3-amyloxybenzenesulfonylurethane and 1-amino-4-ethyl-1,2,3,6-tetrahydropyridine instead of 4-methylbenzenesulfomethylurethane and 1-amino-4-methyl-1,2,3,6-tetrahydropyridine.

EXAMPLE 29.—N - (4 - VALERYLBENZENESULFONYL) - N'-(1,2,3,6-TETRAHYDRO-2,6-DIMETHYL-4-ETHYL-1-PYRIDYL)UREA FREE BASE

In the same manner as shown in Example 2, Part D, N - (4 - valerylbenzenesulfonyl) - N' - (1,2,3,6 - tetrahydro-2,6-dimethyl-4-ethyl-1-pyridyl)urea free base was prepared by using 4-valerylbenzenesulfonylurethane and 1 - amino - 2,6 - dimethyl - 4 - ethyl - 1,2,3,6 - tetrahydropyridine instead of 4-methylbenzenesulfomethylurethane and 1-amino-4-methyl-1,2,3,6-tetrahydropyridine.

As indicated hereinbefore the compounds of the present invention are useful in the lowering of blood sugar perorally and for this purpose the active compounds are associated with a pharmaceutically acceptable carrier.

For such oral administration the active compounds can be administered in liquid or solid dosage forms. Solid forms include capsules, tablets, powders, pills, granules, and the like, and liquid forms include suitably flavored aqueous suspensions and solutions (depending on concentration desired), and flavored oil suspensions and solutions wherein edible oils, e.g., corn oil, cottonseed oil, coconut oil, peanut oil, sesame oil, or mixtures of these, and the like can be employed.

For preparing compositions such as tablets and other compressed formulations the composition can include any compatible and edible tableting material used in pharmaceutical practice; e.g., corn starch, lactose, dibasic calcium phosphate, stearic acid, magnesium stearate, talc, methylcellulose, and the like, can be employed.

Similarly, the compounds of the present invention can be mixed with suitable adjuvants for the preparation of resorbable hard gelatin or soft elastic capsules utilizing conventional pharmaceutical practices.

The novel compositions can also contain in addition to the N - arylsulfonyl-N'-(1,2,3,6-tetrahydro-1-pyridyl)urea free bases having Formula I above or acid addition salts thereof, other blood sugar reducing compounds as supplementary active ingredients such as tolbutamide, chlorpropamide, and phenformin. Such supplementary active ingredients can be included in these compositions in amounts approximately equal to or less than the concentrations employed where such materials are the sole active ingredients.

The following illustrative compositions are within the scope of the present invention:

(1) *Hard gelatin capsules.*—10,000 two-piece hard gelatin capsules for oral use, each containing 200 milligrams of N-(4-methylbenzenesulfonyl)-N'-(1,2,3,6-tetrahydro-4-methyl-1-pyridyl)urea free base are prepared from the following amounts and types of materials:

| | Gm. |
|---|---|
| N - (4 - methylbenzenesulfonyl)-N'-(1,2,3,6-tetrahydro-4-methyl-1-pyridyl)urea free base | 2000 |
| Corn starch | 1616 |
| Mineral oil, U.S.P. | 129.6 |
| Magnesium stearate, powder | 162 |
| Talc, U.S.P. | 162 |

The finely powdered N-(4-methylbenzenesulfonyl)-N'-(1,2,3,6-tetrahydro-4-methyl-1-pyridyl)urea free base is mixed thoroughly with the rest of the ingredients and then capsulated.

(2) *Soft elastic capsules.*—One-piece soft elastic capsules for oral use, each containing 100 milligrams of N-(4-methylbenzenesulfonyl) - N' - (1,2,3,6-tetrahydro-1-pyridyl)urea free base are prepared in the usual manner by first dispersing the active ingredient in sufficient corn oil to render the material capsulatable.

(3) *Oil suspension.*—An oil suspension for oral use, containing in each 5 milliliters 200 milligrams of N-(4-methylbenzenesulfonyl) - N' - (1,2,3,6-tetrahydro-1-pyridyl)urea free base is prepared from the following types and amounts of materials:

| | |
|---|---|
| Sweetening agent gm | 3.5 |
| N - (4 - methylbenzenesulfonyl)-N'-(1,2,3,6-tetrahydro-1-pyridyl)urea free base gm | 400 |
| Preservative gm | 20 |
| Antioxidant gm | 1 |
| Flavoring ml | 25 |
| Aluminum monostearate-corn oil gel to make 10,000 ml. | |

(4) *Tablet.*—10,000 oral tablets each containing 250 milligrams of N-(4-methylbenzenesulfonyl)-N'-(1,2,3,6-tetrahydro-1-pyridyl)urea free base are prepared from the following types and amounts of materials:

| | Gm. |
|---|---|
| N - (4 - methylbenzenesulfonyl)-N'-(1,2,3,6-tetrahydro-1-pyridyl)urea free base | 2500 |
| Dicalcium phosphate | 3050 |
| Methylcellulose, U.S.P. (15 c.p.s.) | 65 |
| Talc, bolted | 450 |
| Calcium stearate, fine powder | 35 |

The ingredients are mixed in a conventional manner and compressed into tablets, each containing 250 mg. of active ingredient.

(5) *Syrup.*—A sugar-free syrup for oral use containing in each 5 milliliters 250 milligrams of N-(4-methylbenezenesulfonyl) - N' - (1,2,3,6 - tetrahydro - 4 - methyl-1-pyridyl)urea free base is prepared from the following types and amounts of materials:

| | |
|---|---|
| N-(4-methylbenzenesulfonyl)-N'-(1,2,3,6-tetrahydro-4-methyl-1-pyridyl)urea free base gm | 500 |
| Methylparaben, U.S.P. gm | 3 |
| Sorbic acid gm | 3 |
| Sweetening agent gm | 18 |
| Flavoring ml | 3 |
| Glycerin ml | 1500 |
| Deionized water to make 10,000 ml. | |

A dose of 1 teaspoonful (5 ml.) to 1 tablespoonful (15 ml.) will give the patient 250 to 750 mg. of N-(4-methylbenzenesulfonyl) - N' - (1,2,3,6 - tetrahydro - 4 - methyl-1-pyridyl)urea free base.

The dosage of the novel compounds of the present invention for the treatment of diabetes depends on the age, weight, and condition of the patient being treated. Generally speaking, for adult oral administration the preferred unit dosage is 50 to 500 mg. of active compound with a suitable pharmaceutical diluent and/or lubricant. One

I claim:
1. A compound selected from the group consisting of (1) N-arylsulfonyl-N'-(1,2,3,6-tetrahydro-1-pyridyl) urea free bases having the formula:

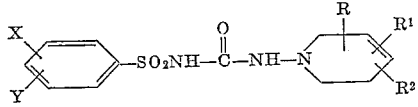

wherein X and Y are selected from the group consisting of hydrogen, alkyl of 1 to 8 carbon atoms, inclusive, alkoxy of 1 to 8 carbon atoms, inclusive, alkanoyl of 2 to 5 carbon atoms, inclusive, halogen, and primary amino ($NH_2$), and R, $R^1$, and $R^2$ are selected from the group consisting of hydrogen and alkyl of 1 to 4 carbon atoms, inclusive, and (2) pharmacologically acceptable acid addition salts thereof.

2. N-arylsulfonyl-N'-(1,2,3,6-tetrahydro-1-pyridyl)urea having the formula:

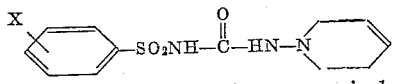

wherein X is alkyl of 1 to 8 carbon atoms, inclusive.

3. N-arylsulfonyl-N'-(1,2,3,6-tetrahydro-1-pyridyl)urea having the formula:

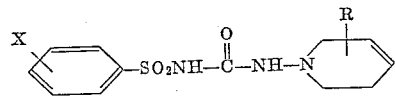

wherein X is alkyl of 1 to 8 carbon atoms, inclusive, and R is alkyl of 1 to 4 carbon atoms, inclusive.

4. N-arylsulfonyl-N'-(1,2,3,6-tetrahydro-1-pyridyl)urea having the formula:

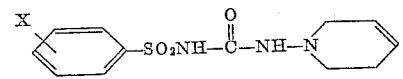

wherein X is halogen.

5. N-arylsulfonyl-N'-(1,2,3,6-tetrahydro-1-pyridyl)urea having the formula:

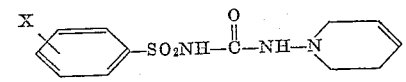

wherein X is alkoxy of 1 to 8 carbon atoms, inclusive.

6. N-arylsulfonyl-N'-(1,2,3,6-tetrahydro-1-pyridyl)urea having the formula:

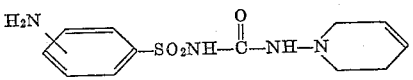

7. N-arylsulfonyl-N'-(1,2,3,6-tetrahydro-1-pyridyl)urea having the formula:

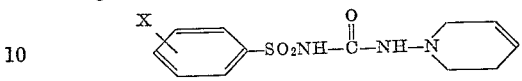

wherein X is alkanoyl of 2 to 5 carbon atoms, inclusive.

8. N - (4 - chlorobenzenesulfonyl) - N' - (1,2,3,6 - tetrahydro-1-pyridyl)urea.

9. N - (4 - methylbenesulfonyl) - N' - (1,2,3,6 - tetrahydro-1-pyridyl)urea.

10. N - (4 - methylbenzenesulfonyl) - N' - (1,2,3,6 - tetrahydro-4-methyl-1-pyridyl)urea.

11. An oral composition effective for the lowering of blood sugar comprising as active ingredient about 50 mg. to about 500 mg. of at least one compound selected from the group consisting of (1) N-arylsulfonyl-N'-(1,2,3,6-tetrahydro-1-pyridyl)urea free bases having the formula:

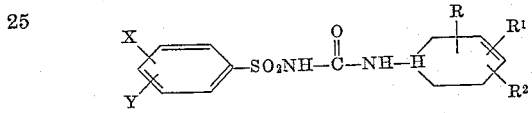

wherein X and Y are selected from the group consisting of hydrogen, alkyl of 1 to 8 carbon atoms, inclusive, alkoxy of 1 to 8 carbon atoms, inclusive, alkanoyl of 2 to 5 carbon atoms, inclusive, halogen, and primary amino ($NH_2$), and R, $R^1$, and $R^2$ are selected from the group consisting of hydrogen and alkyl of 1 to 4 carbon atoms, inclusive, and (2) pharmacologically acceptable acid addition salts thereof, and a diluent amount of a pharmaceutically acceptable carrier.

References Cited in the file of this patent
UNITED STATES PATENTS

| | | |
|---|---|---|
| 2,909,525 | Fand | Oct. 20, 1959 |
| 2,928,871 | Aeschlimann et al. | Mar. 15, 1960 |
| 2,947,756 | Huebner | Aug. 2, 1960 |
| 2,953,570 | Rudner | Sept. 20, 1960 |
| 2,974,166 | Aeschlimann et al. | Mar. 7, 1961 |

FOREIGN PATENTS

| | | |
|---|---|---|
| 789,702 | Great Britain | Jan. 29, 1958 |